United States Patent
McAllister (10) Patent No.: US 7,866,642 B2
(45) Date of Patent: Jan. 11, 2011

(54) MODULAR UNIVERSAL HOLDING FIXTURE

(75) Inventor: Steven J. McAllister, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 1114 days.

(21) Appl. No.: 11/552,250

(22) Filed: Oct. 24, 2006

(65) Prior Publication Data

US 2008/0127474 A1 Jun. 5, 2008

(51) Int. Cl.
B25B 1/20 (2006.01)
(52) U.S. Cl. .................. 269/37; 269/266; 269/904; 269/910
(58) Field of Classification Search .............. 269/37, 269/21, 20, 296, 266, 297, 904, 910; 29/281.1, 29/33 K; 144/144.51, 345
See application file for complete search history.

(56) References Cited

U.S. PATENT DOCUMENTS

| | | | |
|---|---|---|---|
| 4,527,783 A | 7/1985 | Collora et al. | |
| 4,640,501 A | 2/1987 | Poland | |
| 4,656,791 A | 4/1987 | Herrington et al. | |
| 4,684,113 A | 8/1987 | Douglas et al. | |
| 5,092,028 A * | 3/1992 | Harnden | 29/709 |
| 5,318,005 A | 6/1994 | Mayer | |
| 5,457,868 A * | 10/1995 | Blaimschein | 29/559 |
| 5,700,117 A * | 12/1997 | Sella | 409/164 |
| 5,947,460 A * | 9/1999 | Williams | 269/37 |
| 6,386,805 B1 | 5/2002 | Suzuki | |
| 6,418,602 B2 | 7/2002 | Crocker et al. | |
| 6,488,060 B1 * | 12/2002 | Giovanni | 144/2.1 |
| 6,607,336 B1 | 8/2003 | Suzuki | |
| 6,764,434 B1 * | 7/2004 | Volk | 483/36 |
| 7,584,947 B2 * | 9/2009 | Freeland | 269/296 |
| 2002/0050672 A1 * | 5/2002 | Moncavage | 269/266 |
| 2008/0127474 A1 * | 6/2008 | McAllister | 29/33 K |

* cited by examiner

Primary Examiner—Lee D Wilson
(74) Attorney, Agent, or Firm—Haynes and Boone, LLP (57) ABSTRACT

A modular universal holding fixture and corresponding methods, accommodating a wide range of workpiece contours, geometries, sizes, and configurations. The fixture may include a fiducial base, a registration frame, and a bridge module. Fixable to a fiducial (reference) location, the fiducial base may be attached in alignment to the registration frame. The bridge module may have a central cavity and guide tracks on top, exterior, and interior support surfaces. The bridge module transversely engages the registration frame for longitudinal movement to a registration position, and supports a tooling for transverse movement. The bridge module may repositionably constrain the tooling at an indexed position. The bridge module may be configured to engage multiple types of tooling and additional tooling headers, supports, and side actuators. A tooling may be passive linear actuators positioned by a N/C operated gantry engaged with the registration frame.

21 Claims, 7 Drawing Sheets

MODULAR UNIVERSAL HOLDING FIXTURE

TECHNICAL FIELD

This invention generally pertains to the field of aviation, in general, and more particularly, to a holding fixture used to hold a workpiece during aircraft manufacturing.

BACKGROUND

In the production of contoured panels and parts utilized in aircraft or other large structures, it is desirable to securely hold a workpiece in order to perform precision machining or finishing operations. These operations may include, for example, cutting, drilling, trimming, and smoothing. Particularly in the aerospace industry, strong, lightweight workpieces made of composite materials are employed for an increasingly wider range and geometry of aircraft parts. In general, a composite material is typified by a structure of very strong fibers embedded in a softer matrix, for which the conventional machining techniques employed on metal parts may not be suitable. Instead, many machining or smoothing operations on composite workpieces employ high-pressure water jets guided by a numerically-controlled (N/C) machining system such as a multi-axis composite machining center (CMC) system. A CMC system typically directs gantry-mounted effectors to perform operations on a workpiece that is securely held by some form of holding fixture, which is positioned relative to an established reference frame.

Current holding fixtures are typified by a fixed machine bed, foundation, or platen, typically using pogo-type supports, to which linear actuators and other tooling devices are mounted. In turn, the workpiece is supported in the desired position by the linear actuators, while the effector (e.g., a high pressure water jet) moves about the gantry and acts on the workpiece. In general, current holding fixtures provide a fixed machine bed pattern having a limited number of tooling mounting locations available to support a limited number of tooling devices. In addition, a fixed machine bed pattern does not accommodate workpieces exhibiting a wider range of contours, geometries, and configurations, thereby inhibiting the future growth of part families. Moreover, in many present implementations, linear actuators are active, i.e., operate to set their respective height relative to the workpiece. Understandably, this type of linear actuator may be more expensive and complex to operate. In some cases, self-positioning by individual tooling may provide less accurate workpiece positioning due to the variability of errors among the array of tooling apparatus, and additional quality control equipment or processes may be needed. Therefore, current universal holding fixtures, as well as implementations attempting to address the aforementioned limitations, tend to be costly, complex, or both. There is a need for an universal holding fixture capable of supporting a workpiece during a manufacturing operation, capable of providing high-precision manufacturing operations using less costly tooling, and capable of accommodating workpieces exhibiting a wide range of contours, geometries, and configurations,

BRIEF SUMMARY

Systems and methods are disclosed herein to provide a modular universal holding fixture capable of supporting a workpiece during a manufacturing operation; providing high-precision manufacturing operations using less costly tooling; and accommodating workpieces exhibiting a wide range of contours, geometries, and configurations.

For example, in accordance with an embodiment of the present invention, a universal holding fixture is provided, which may include a fiducial base, a registration frame, and a bridge module. The fiducial base may be fixable to a predefined fiducial location. The bridge module may be positionable at a selectable registration position corresponding to the predefined fiducial location, and may be configured to support for transverse movement and to repositionably constrain a tooling. The bridge module also may be configured to repositionably constrain the tooling at a selectable indexed position The registration frame may be attached in alignment with the fiducial base and extending along a longitudinal axis, and the bridge module may be configured to moveably engage with the registration frame at the selectable registration position.

In accordance with another embodiment of the present invention, an apparatus for holding a workpiece in a preselected position during a manufacturing operation is provided. The apparatus may include a foundation, rails mounted lengthwise on the foundation, a fixed mounting base attached to one end of the foundation length, and moveable carriages mounted on the rails and moveable along the foundation length. The foundation may be longer in length than in width, and an array of vertically adjustable linear actuators may be supported within the fixed mounting base, and may be adjustably positioned across the foundation width. Also, a series of vertically adjustable linear actuators may be mounted, and transversely moveable, on respective moveable carriages, such that the series of vertically adjustable linear actuators may be moveable along the foundation length and the foundation width. The apparatus also may include a gantry mounted above the foundation on the rails and moveable along the foundation length. The gantry may position the vertically adjustable linear actuators in one or more of the x, y, or z directions, may include a multi-axis head capable of performing a manufacturing operation, and may be operable by a numerically-controlled machine.

In addition, yet another embodiment of the present invention provides a method of holding a workpiece in a preselected position during a manufacturing operation, which may include adjustably positioning moveable carriages along rails mounted on a foundation. Each moveable carriage includes a respective series of vertically adjustable linear actuators mounted thereon. The method also includes adjustably positioning ones of the respective series of vertically adjustable linear actuators across a width of a respective moveable carriage. The foundation length may be longer than the foundation width. The moveable carriages may be moved lengthwise on the foundation.

Moreover, in accordance with still another embodiment of the present invention, a universal holding fixture is provided, which may include a fiducial base, a stationary bridge module affixed to the fiducial base at a selectable stationary registration position, a registration frame attached in alignment with the fiducial base, and a moveable bridge module configured to engage with the registration frame at a selectable registration position corresponding to the predefined fiducial location. The fiducial base may be fixable to a predefined fiducial location. The registration frame also may extend along a longitudinal axis corresponding to the predefined fiducial location. In addition, the registration frame may be formed with registration frame modules, in which at least one of the registration frame modules releasably interlocks with at least one other of the registration frame modules. Accordingly, the universal holding fixture may be a modular universal holding fixture. The stationary bridge module may be configured to support for transverse movement and to repositionably constrain a tooling at a selectable indexed position corresponding to the predefined fiducial location. The moveable bridge module may be configured to support for transverse movement and to repositionably constrain another tooling at another selectable indexed position corresponding to the predefined fiducial location. Also, the moveable bridge module may be configured to engage with the registration frame at a selectable registration position corresponding to the predefined fiducial location.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The present disclosure describes embodiments of a modular universal holding fixture and corresponding methods, capable of accommodating a wide range of workpiece contours, geometries, sizes, and configurations. The universal holding fixture herein may be configured in one or more embodiments to hold a workpiece in a definable spatial relationship relative to a known fiducial location, or "home," within a corresponding spatial reference system. A fiducial location generally describes a known reference location that may be used by a human operator or a machine to identify boundary conditions within a common spatial reference system and to identify selected locations in the reference system with uniformly high precision. By way of definition, registration is the process of establishing correspondences between a local frame of reference and a defined fiducial location; a registration position is an identified location for which such a local frame of reference has been established. Also, to "correspond to" a known location is to be in a defined spatial relationship with that location. For example, a particular registration position corresponding to a known fiducial location may identify a particular plane or set of planes within a known spatial reference system. Indexing is the process of establishing a point or region of operation within a local frame of reference; an indexed position is a point or region of operation so identified. A reference position may correspond to one or more indexed position(s). As used herein, an indexed position, and the location of objects at the indexed position, may be made to correspond to a known fiducial location by making the registration position correspond to the known fiducial location.

Figure 1:
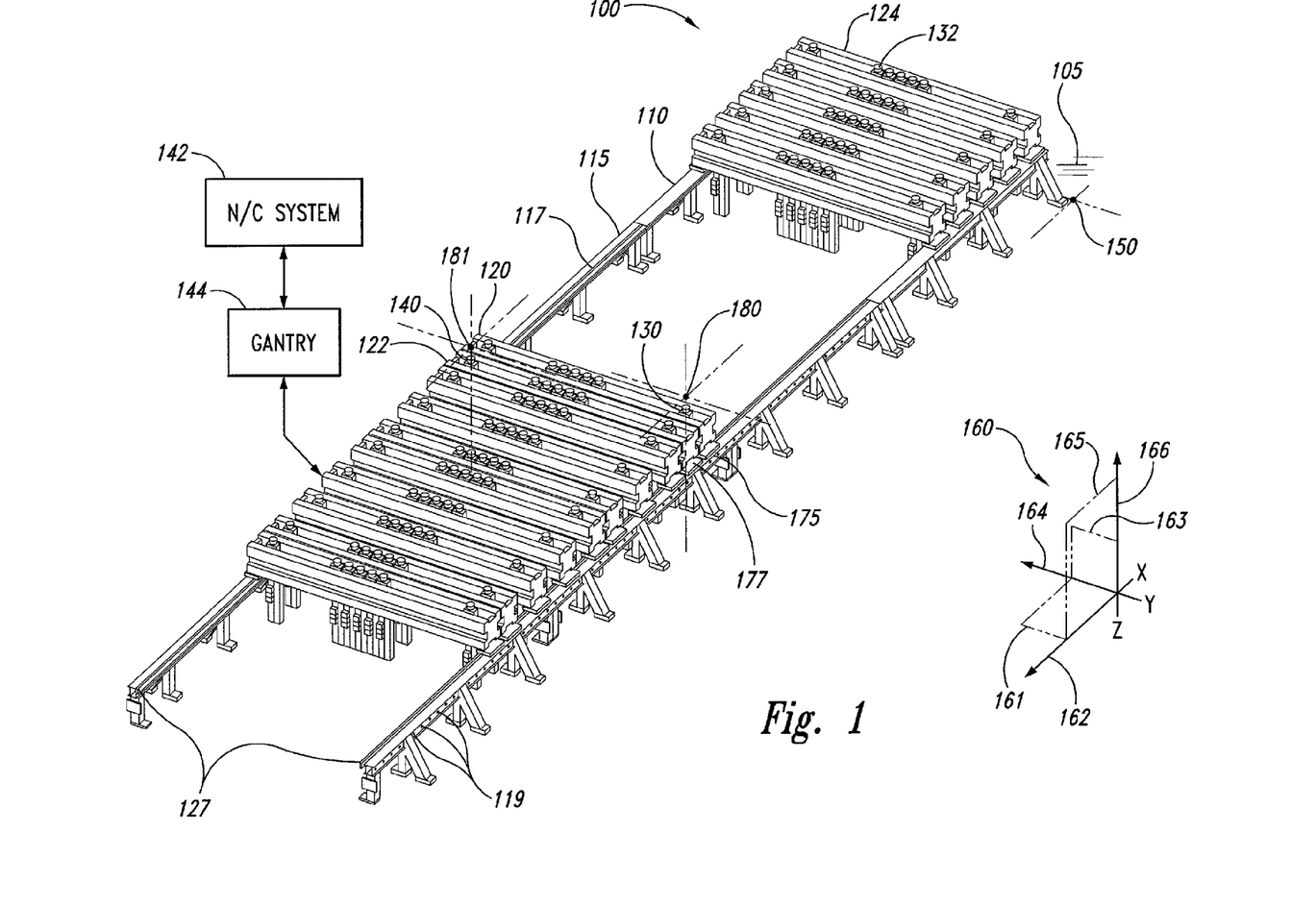
FIG. 1 is a graphical illustration of an embodiment of a modular universal holding fixture, in accordance with the present invention.

Turning to FIG. 1, exemplary modular universal holding fixture 100 may include fiducial base 110, registration frame 115, and bridge module 120. Fiducial base 110 may be fixable to predefined fiducial location 150. Predefined fiducial location 150 unambiguously demarcates a position and forms the basis for reliable and repeatable determination of any point or region within predefined reference system 160, relative to fiducial location 150. Accordingly, a human operator or location-aware machine may use fiducial location 150 to position a contoured workpiece accurately within the workspace, and to locate desired workpiece points precisely for desired operations. Desirably, fiducial base 110 may be firmly affixed to facility foundation 105, thereby establishing predefined fiducial location 150 and, by extension, predefined reference system 160. Without loss of generality, reference system 160 may be illustrated as a three-dimensional spatial reference system, which may extend along longitudinal (X) axis 162, transverse (Y) axis 164, and vertical (Z) axis 166. Within reference system 160, there also may be defined horizontal (XY) plane 161, a transverse-vertical (YZ) plane 163, and longitudinal-vertical (XZ) plane 165. However, it must be understood that reference system 160, including related spatial, axial, or planar constructs, are provided for the purpose of illustration only. Fiducial base 110 and predefined fiducial location 150 are not confined within reference system 160, and selected embodiments of the present invention are not limited to applications within such reference system 160.

Registration frame 115 generally may extend along longitudinal axis 162, and may be securely attached in alignment with fiducial base 110. Bridge module 120 may be transversely engaged, lengthwise, with registration frame 115, and may be repositioned along longitudinal axis 162 at a selectable registration position on registration frame 115. Selectable registration position 175 for bridge module 120 may be defined on registration frame 115. Registration positions, such as selectable registration position 175, may be demarcated by mechanical and electronic methods known to the art, including, without limitation, indicia 119 affixed to registration frame 115, indexing-rod-and-bushing apparatus, and electromechanical sensors. Beneficially, registration frame 115 may be disposed with open end 127 for attaching additional apparatus, including, without limitation, a worktable, spar support, or small tooling. Registration frame 115 may include glide 117, disposed on registration frame 115 along longitudinal axis 162 to contact and facilitate the repositioning of bridge module 120. In FIG. 1, exemplary glide 117 may be implemented as one or more rails, however, glide 117 may be implemented by any suitable components including, without limitation, a slider, a roller, or a bearing race.

Bridge module 120 may be configured to support and retain at least one object. An object may be tooling 130, a workpiece (not shown), or both. Also, the term tooling may be representative of many types of objects used in manufacturing a contoured workpiece, including without limitation, a linear actuator, a spar support, a spar tool, a drill, an indexer, a locking mechanism, and a positioner. In addition, bridge module 120 may provide indexing of an object within a local frame of reference defined at selectable registration position 175; and may repositionably constrain the object, such as tooling 130, to selectable indexed position 180. Advantageously, bridge 120 may be moved, positioned, or re-positioned and made to correspond to predefined fiducial location 150. Bridge module 120 may be moved manually to selectable registration position 175. However, bridge module 120 also may be adapted for automated longitudinal positioning to selectable registration position 175, for example, using a computer-controlled indexing machine. As used herein, the term "repositionably constrain" describes a characteristic by which bridge module 120 may be capable of facilitating lengthwise movement and positioning of tooling 130 parallel to transverse axis 164, and may be configured to affirmatively constrain tooling 130, once moved, to selectable indexed position 180. Selectable indexed position 180 corresponds to selectable registration position 175 which, in turn, may be made to correspond to predefined fiducial location 150, so that the spatial location corresponding to selectable indexed position 180 may be determined unambiguously. Thus, tooling 130 can precisely contact a held workpiece (not shown) at selectable indexed position 180, relative to predefined fiducial location 150. Selectable indexed position 180 may correspond to one or more selected reference planes within predefined spatial reference system 160 including, without limitation, horizontal plane 161, transverse-vertical plane 163, longitudinal-vertical plane 165, a plane corresponding to a predetermined combination thereof, or any other plane defined within predefined spatial reference system 160.

Modular universal holding fixture 100 may accommodate plural bridge modules, such as module 120, 122, each capable of being moved to a respective registration position. Typically, each moveable bridge module 120, 122 may be positioned at respective selectable registration positions 175, 177, and may be capable of holding multiple tooling 130, 140 each at a respective indexed location 180, 181 corresponding to the respective selectable registration position 175, 177. In certain embodiments, it may be desirable to provide bridge module 124 as a stationary bridge module affixed to fiducial base 110 at a preselected stationary registration position 175. Once positioned, bridge module 124 may be firmly affixed to fiducial base 110, for example by bolting, clamping, or otherwise securing, such that the movement of bridge module 124 on fiducial base 110 may be substantially prevented. Similar to moveable modules 120, 122, bridge module 124 may be capable of holding at least one tooling 132, each at a respective indexed location corresponding to stationary registration position 165, and may constrain tooling 132 in a selectable indexed position corresponding to predefined fiducial location 150. Advantageously, bridge modules 120, 122, 124 may be configured to receive and support a variety of tooling, such that tooling 130, 132, 140 may be but are not required to be, the same type of tooling.

Selectability of bridge module registration position and tooling indexed position facilitates reconfiguration of embodiments of modular universal holding fixture 100 within a workspace, as may occur with a change in workpiece size, configuration, material, or specification. In accordance with the embodiments herein, modular universal holding fixture 100 may be reconfigured, yet remain fixed to fiducial location 150 and spatially-referenced to predefined spatial reference system 160. In addition, between manufacturing operations for different production parts, modular universal holding fixture 100 may be reconfigured, and be referenced to a different spatial reference system, for example, by fixing fiducial base 110 to a different fiducial location on foundation 105. In such an instance, the re-referenced modular universal holding fixture 100 may be reconfigured, as previously described, within the new spatial reference system.

Figure 5:
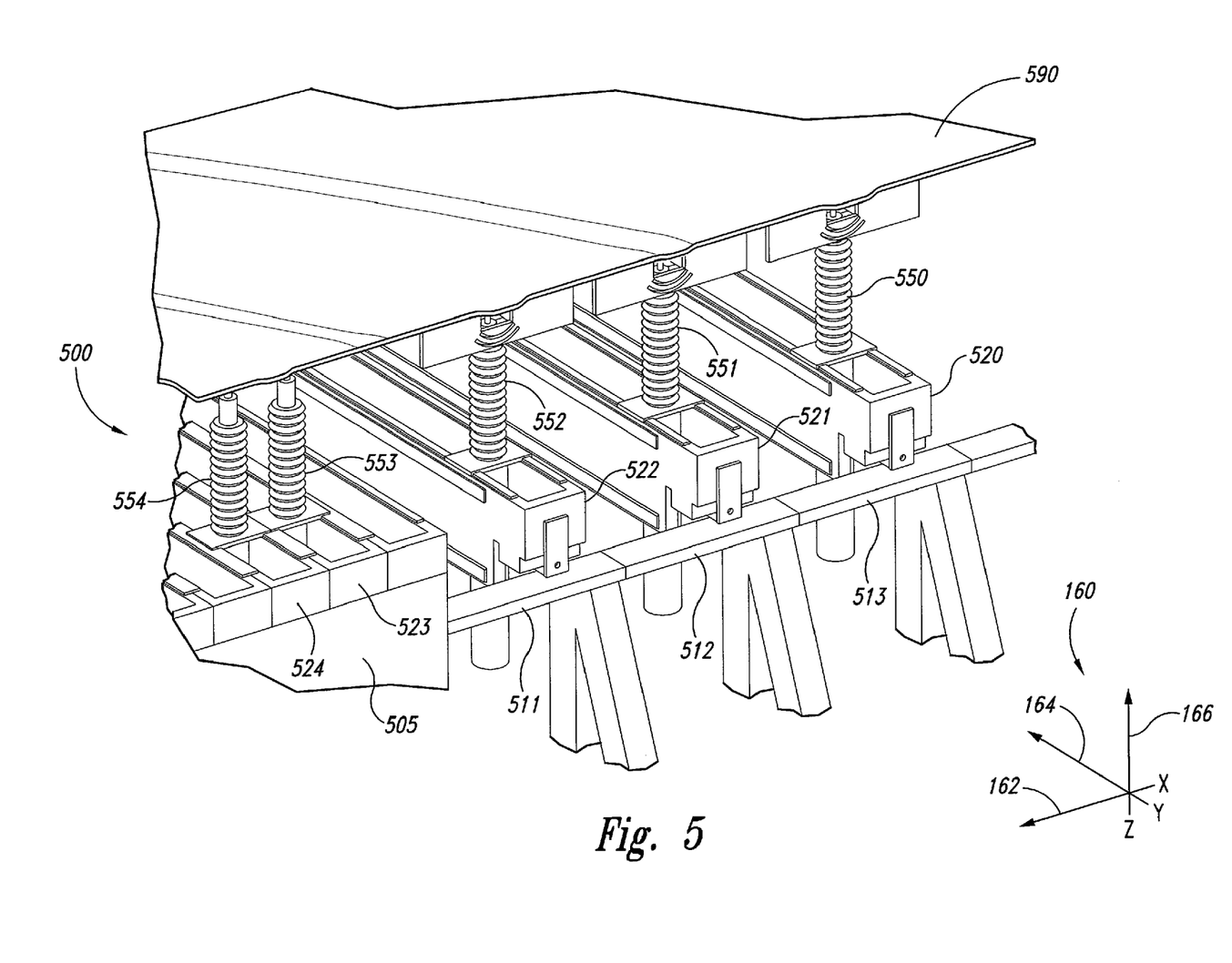
FIG. 5 is a is a graphical illustration of a workpiece supported for a manufacturing operation employing one embodiment of a modular universal holding fixture in accordance with the present invention.
Figure 6:
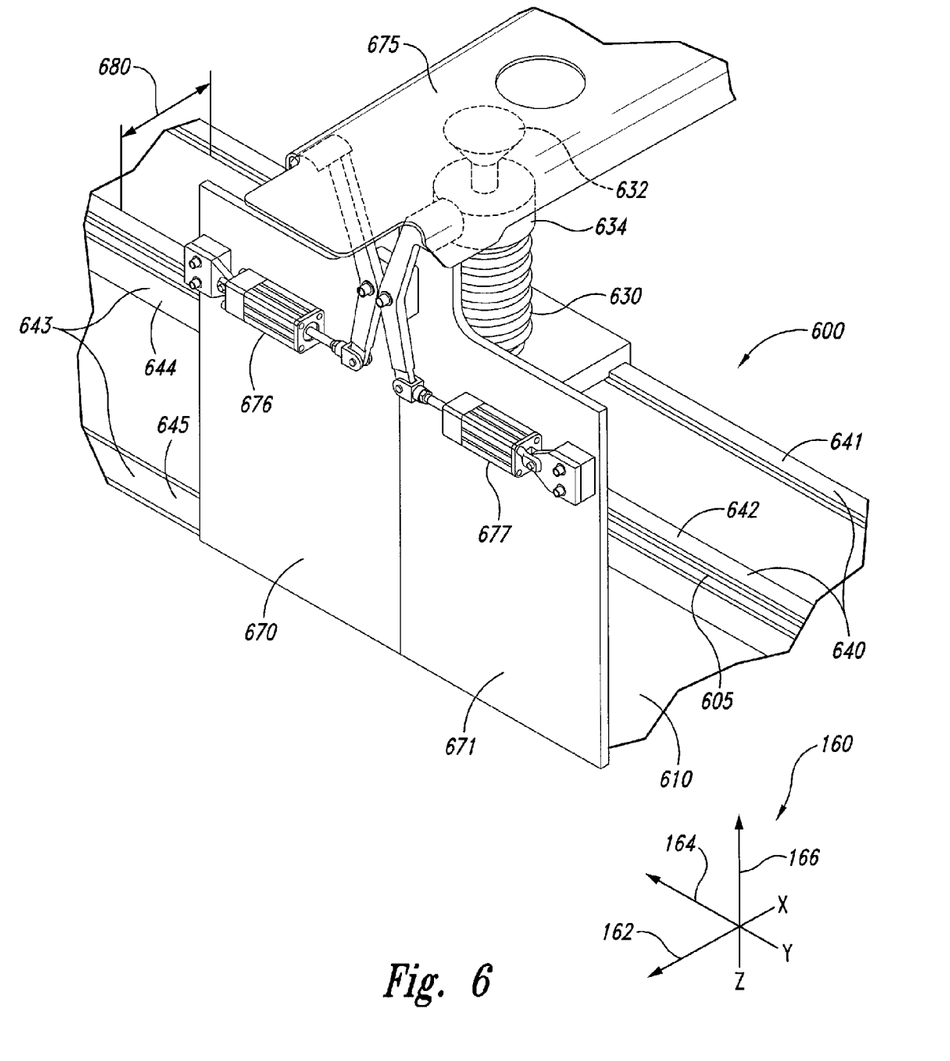
FIG. 6 is a graphical illustration of another workpiece supported for a manufacturing operation employing another embodiment of the bridge module in accordance with the present invention.
Figure 7A:
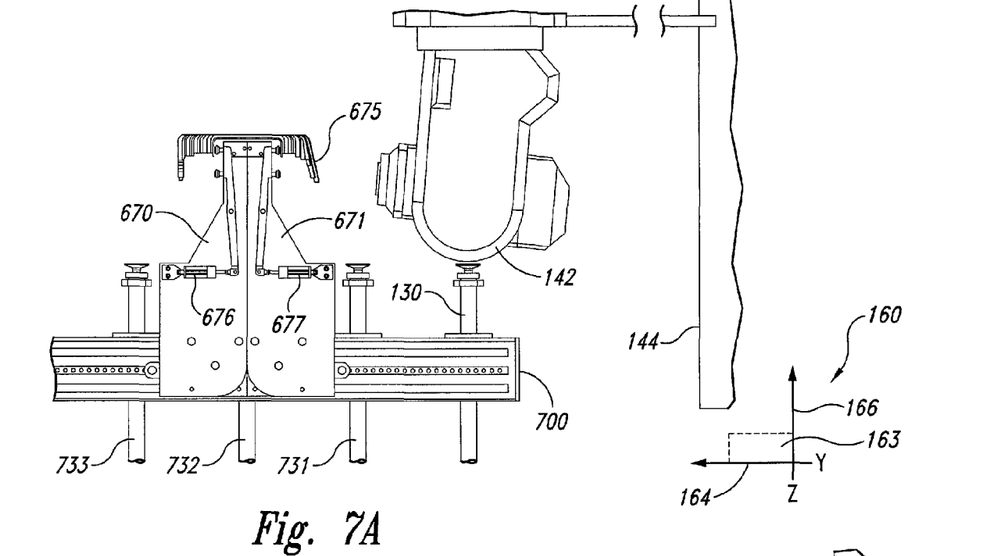
FIG. 7A is a graphical illustration of a side view of a bridge module embodiment as depicted in FIGS. 1 and 2, supporting a spar as depicted in FIG. 6, cooperatively operating with a gantry-mounted N/C machine head indicated in FIG. 1, in accordance with the present invention.
Figure 7B:
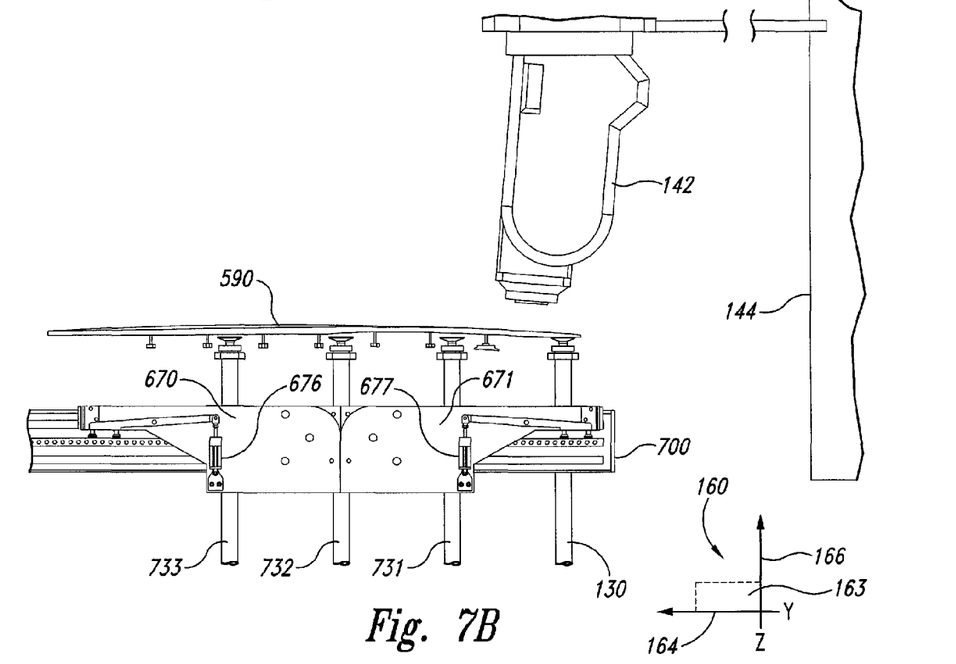
FIG. 7B is a graphical illustration of a side view of a bridge module embodiment as depicted in FIGS. 1 and 2, supporting a workpiece as depicted in FIG. 5, cooperatively operating with a gantry-mounted N/C machine head indicated in FIG. 1, in accordance with the present invention.

Conveniently, fiducial base 110 and bridge module 120, 122, 124 may be machined weldments with selected mechanical and pneumatic hardware attached, including a tooling such as a linear actuator. Present embodiments may be configured to cooperatively operate with numerically-controlled (N/C) machines. For example, it may be desirable that bridge module 120 configuration permit exemplary tooling 130 to be moved transversely (along axis 164 in plane 163) and positioned on bridge module 120, for example, by an N/C machine head (generally at 142) mounted on a gantry (generally at 144), and positioned over modular universal holding fixture 100. FIG. 7A illustrates an exemplary embodiment of a bridge module, such as bridge module 120, 122, 124, and bridge module 200 of FIG. 2, supporting a spar as depicted in FIG. 6, cooperatively operating with N/C machine head 142 mounted on gantry 144. FIG. 7B illustrates an exemplary embodiment of a bridge module, such as bridge module 120, 122, 124 and bridge module 200 of FIG. 2, supporting a workpiece as depicted in FIG. 5, cooperatively operating with N/C machine head 142 mounted on gantry 144.

Moreover, it may be desirable that a bridge module configuration permit tooling 130 to similarly be moved, positioned, and locked along vertical axis 166 (in plane 165), thereby facilitating indexed positioning of tooling 130, in at least one of planes 163, 165. Such freedom of motion in the respective horizontal and vertical directions permit tooling 130 to be repositionably constrained in indexed position, which may be defined relative to planes 161, 163, 165, or a combination thereof. Advantageously, modular universal holding fixture 100 may permit the use of less complex and less expensive tooling, such as passive linear actuators. In general, horizontal and vertical positions of passive linear actuators, including a linear actuator height and inter-actuator distance, may be set and locked/constrained by an N/C machine. Accordingly, operations implementing modular universal holding fixture 100 may tend to increase overall system accuracy, and may be less costly to operate and to maintain.

Figure 2:
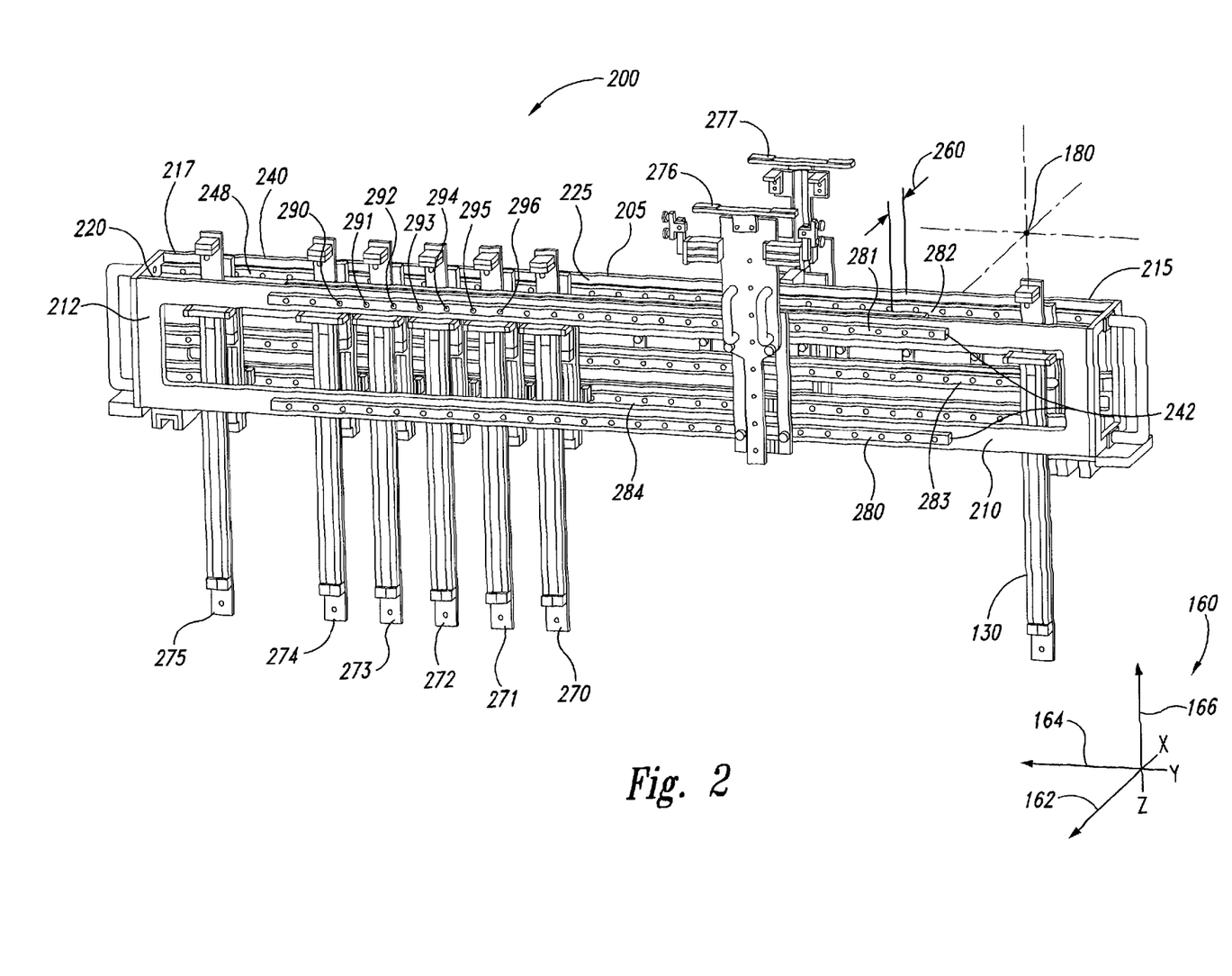
FIG. 2 is a depiction of a bridge module embodiment in accordance with the present invention, which may be used with the modular universal holding fixture illustrated in FIG. 1.

In FIG. 2, exemplary bridge module 200 may be similar to bridge modules 120, 122, 124 in FIG. 1. Bridge module 200 may be configured to include tooling such as tooling 270-275 on one or on or between more than one bridge support surfaces, disposed on a side corresponding to horizontal plane 161, transverse-vertical plane 163, or both. In particular, bridge module 200 provides support for transverse movement of tooling 130, 270-277, relative to reference system 160. Bridge support surfaces provide support for tooling weight and balance, as well as facilitate appropriate movement or motion constraint in one or more of planes 161, 163, 165. For example, bridge module 200 may be configured with five support surfaces—one horizontal support surface, and four lateral support surfaces—on which tooling 130, 270-277 may be repositionably constrained at a selectable indexed position. Generally, bridge module 200 may be configured with top bridge support surface 205, being generally parallel to horizontal plane 161. Also, bridge module 200 may be configured to support external positioning of tooling 276, 277 by providing exterior lateral support surfaces disposed on bridge module 200 generally lengthwise and in parallel with transverse-vertical plane 163. Exterior lateral support surfaces include front exterior lateral bridge support surface 210, disposed on the exterior of front transverse side 212, and rear exterior lateral bridge support surface 215, disposed on the exterior of rear transverse side 217. In addition, bridge module 200 may be fabricated in an open-frame configuration, with central cavity 260 being sized and shaped to permit internal positioning for tooling 130, 270-275. Accordingly, bridge module 200 includes interior lateral support surfaces disposed on bridge module 200 generally lengthwise within cavity 260, and in parallel with transverse-vertical plane 163. Interior lateral support surfaces include front interior bridge support surface 220, disposed on the interior of front transverse side 212, and rear interior bridge support surface 225, disposed on the interior of rear transverse side 217.

In general, bridge support surfaces 205, 210, 215, 220, 225 provide one or both of vertical or lateral support for attached tooling 130, 270-277. To facilitate movement, positioning, or both, of tooling 130, 270-277 on module 200, one or more of respective bridge support surfaces 205, 210, 215, 220, 225 further may include a respective guide track. Accordingly, top bridge support surface 205 may have top guide track 240 disposed thereon. Similarly, front exterior bridge support surface 210 and exterior rear bridge support surface 215 may include front exterior guide track 242 and rear exterior guide track (not shown), respectively. In embodiments implemented with interior support surfaces, front interior bridge support surface 220 and rear interior bridge support surface 225 may include front interior guide track (not shown), and rear interior guide track 248, respectively. Also, when implemented, one or more of guide tracks 240, 242, 248 may traverse at least a portion of the length of bridge module 200.

Guide tracks 240, 242, 248 may be configured to accept multiple types of tooling, including tooling used during contemplated workpiece manufacturing operations. Accordingly, guide tracks 240, 242, 248 may be provided, for example, in the form of guide rails 280-284, which may be linear guide rails set apart at predetermined intervals to accommodate desired tooling. Other forms of guide tracks, including keyed, slotted, or rounded tracks may be used. Although illustrated in pairs, fewer or more guide rails 280-284 may be disposed on one or more of guide tracks 240, 242, 248. In addition, guide tracks 240, 242, 248 may be configured as removable guide tracks that may be changed to accommodate guide receiving structures found on tooling, thus allowing further tailoring of module 200 to part production demands. Alternatively to guide tracks 240, 242, 248, one or more of bridge support surfaces 205, 210, 215, 220, 225 may be configured with an integral guide flange. While not shown, one having ordinary skill in the art would realize that the exterior rear guide track and the interior front guide track may be similar in configuration and positioning to exterior front guide track 242 and interior rear guide track 248, respectively. However, it may be not required that all, or any, of guide tracks 240, 242, 248, as well as the not shown guide tracks, be identical or symmetric in configuration or distribution.

It may be advantageous to provide index points 290-296 set apart at predefined intervals along one or more bridge support surfaces 205, 210, 215, 220, 225, or guide tracks 240, 242, 248 (including those not shown). Disposed in a defined relative spatial relationship on module 200, index points 290-296 provide points of reference local to module 200 that may be made to correspond with a selectable registration position, such as selectable registration position 175 and, thus, to predefined fiducial location 150. Index points 290-296 permit tooling 130, 270-277 to be repositionably constrained. For example, at selectable registration point 175 generally corresponding to a predefined longitudinal position along X-axis 162, one or more index points on guide track 240, 242, 248 may be used to facilitate positioning of tooling 130, at a predefined transverse location along Y-axis 164, such that tooling 130, 270-277 may be positioned at a predefined horizontal location in XY-plane 161. Selectable indexed position 180 may correspond to the predefined horizontal location, which may be defined additionally with respect to a predefined vertical location along Z-axis 166. Thus, selectable indexed position 180 may be a definable location in one or more of horizontal (XY) plane 161, a transverse-vertical (YZ) plane 163, longitudinal-vertical (XZ) plane 165, or of a combination of planes 161, 163, 165. Index points 290-296 may be a set of holes, grooves, or slots, configured to engage a locking pin (not shown) on exemplary tooling 130, 270-277, and one or more of the set of holes, grooves, or slots may be unthreaded, threaded, or keyed. Other locking mechanisms may be used to repositionably constrain exemplary tooling 130, 270-277, once brought into alignment with respective preselected indexed position 180. In general, positioning and locking mechanisms may be actuated and managed by an N/C machine (not shown). Conveniently, module 200 may be adapted further to accept additional tooling headers and side actuators, such as tooling 276, 277, thereby providing supplementary support for uniquely-configured production parts during workpiece operations. Embodiments of bridge module 200 configured to support, position, and repositionably constrain tooling 276, 277 may be similar to tooling headers 670-671 described in the context for FIG. 6.

Figure 3:
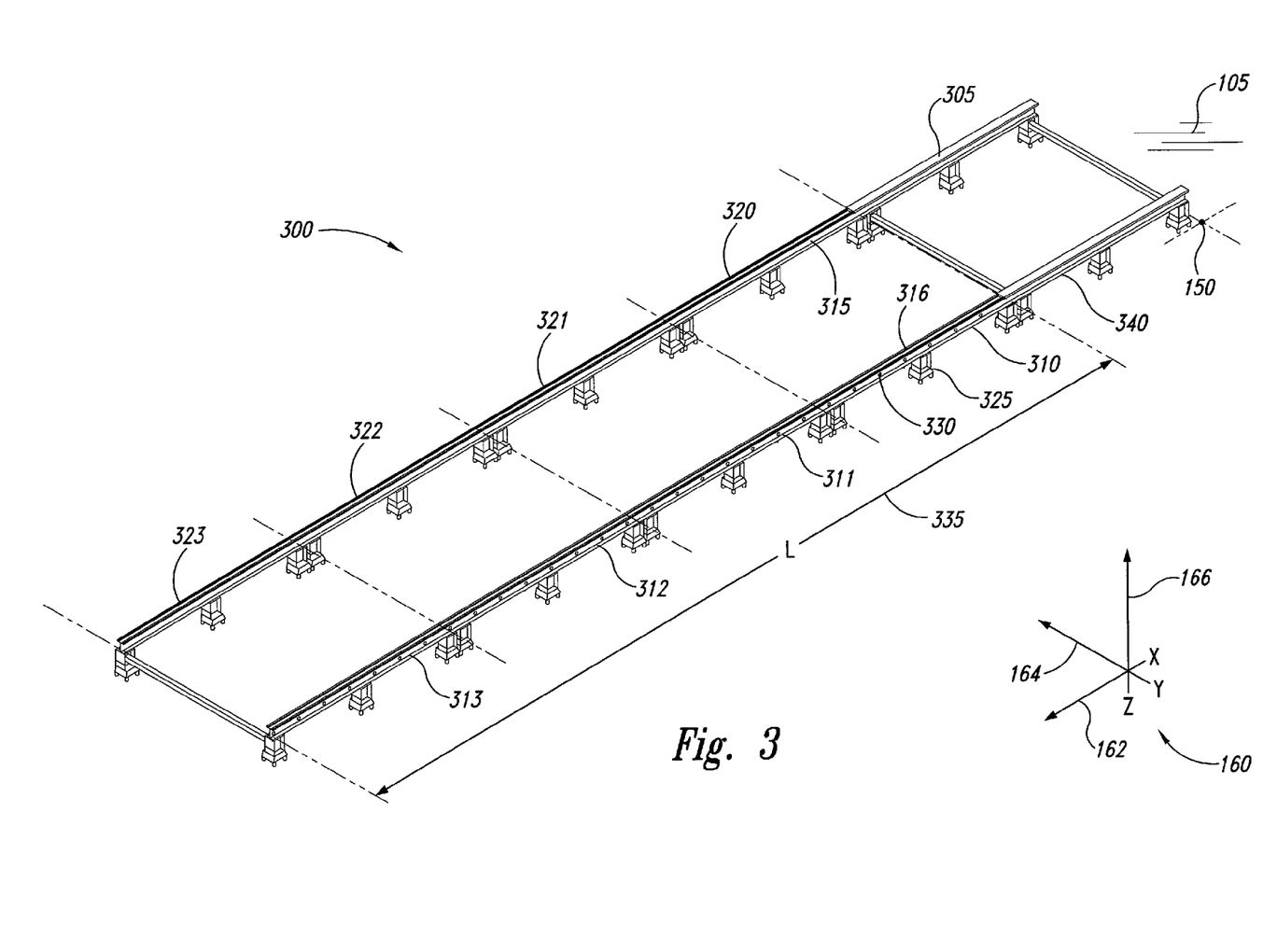
FIG. 3 is a depiction of a modular registration frame embodiment in accordance with the present invention, which may be used with the modular universal holding fixture illustrated in FIG. 1.

FIG. 3 illustrates a modular registration frame 300 depicted as including four registration frame modules 310-313, although more or fewer registration frame modules 310-313 may be employed in practice. Each of registration frame modules 310-313 may be configured to be releasably interlocking with others of registration frame modules 310-313 to form registration frame 300 corresponding to predefined fiducial location 150. When interlocked, modular registration frame 300 may be functionally similar to reference frame 115 in FIG. 1; and fiducial base 305 may represent fiducial base 110 in FIG. 1. Each registration frame module 310-313 may include registration frame run 315, and registration frame support 325. Registration frame run 315 may include two longitudinally-disposed rails sufficiently set apart to engage exemplary bridge module 200. Fewer or more rails may be used and, indeed, the configuration and shape of registration frame run 315 may be fitted to adequately support bridge module 200, attached tooling 130, 270-277. In addition, although registration frame support 325 is depicted as paired pillars distributed beneath registration frame run 315, alternative registration frame support configurations may be used to accommodate weight support, load balance, and characteristics of the load-bearing surface (e.g., foundation 105).

Each registration frame module 310-313 also may have multiple corresponding registration points, exemplified by registration point 330. Registration point 330 may be indicated on the frame support for registration frame module 310-313, as described with respect to FIG. 1, for example, indicia 119. Registration frame point 330 indicates a possible selectable registration position 175 for bridge module 120. In general, when registration frame module 310 is securely attached in alignment to fiducial base 305, registration point 330 may correspond to fiducial location 150, and bridge module 120 may be moved to registration point 330 to be positioned at a particular registration location. Each of registration frame modules 310-313 may interlock securely, yet releasably, with others of registration frame modules 310-313, such that registration frame 300 may be attached in alignment with fiducial base 305, and may extend along longitudinal axis 162. Although of a modular configuration, registration frame modules 310-313 may securely maintain a defined relationship between predefined fiducial location 150 and reference frame registration points, such as registration point 330. Also, registration track modules 310-313 may be configured to permit frame glides 320-323 to abut in a substantially continuous manner when interlocked, so that moveable bridge module 120, 122 may be engaged with frame 300 and repositioned along axis 162 without significant resistance, for example, as otherwise may be caused by discontinuous mating of glides 320-323. Desirably, registration frame modules 310-313 may be configured to be releasably interlocked, thereby allowing the overall length L 335 of registration frame 300 to be lengthened or shortened in order to accommodate a greater or a lesser number of moveable bridge modules 120, 122, respectively.

Figure 4:
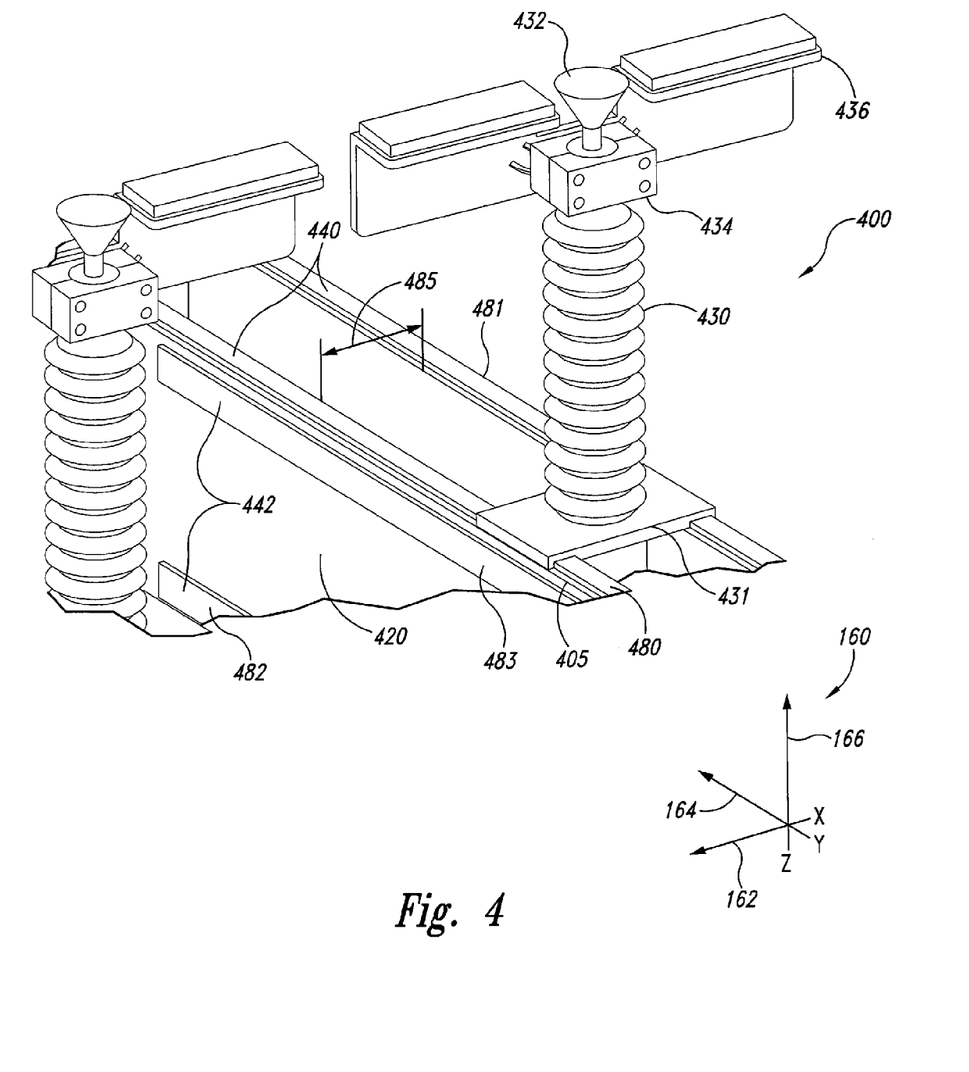
FIG. 4 is a graphical illustration of a bridge module engaging a tooling, in accordance with an embodiment of the present invention.

FIG. 4 is illustrative of exemplary embodiments of the present invention, in which bridge module 400 may be configured to allow a tooling, e.g., passive linear actuator 430, to move along transverse axis 164 of bridge module 400. Bridge module 400 may be substantially similar to bridge modules 120, 122, 124, and 200. Linear actuator 430 may include suction cup assembly 432 and indexable head 434 positioned proximate to, here beneath, suction cup assembly 432. Additionally, linear actuator 430 may be fitted with support tooling 436 coupled to indexable head 434 and adapted to provide support to edges of a workpiece panel (not shown). Bridge module 400 may include top support surface 405, and front exterior support surface 420. Bridge module 400 may be configured with central cavity 485 sized to retain actuator 430 therewithin. Also, top support surface 405 may facilitate transverse movement of actuator 430 by being configured with top support track 440, including a pair of set-apart linear guide rails 480-481 disposed thereon, such that actuator support brace 431 may be moved and repositionably constrained along support track 440. Front exterior support surface 420 also may include front exterior guide track 442 having set-apart linear guide rails 482-483 disposed thereon, which may permit additional tooling or supports to be used.

Bridge module 400 may be configured to repositionably constrain linear actuator 430 in a selectable indexed position, In certain embodiments of the present invention, top support track 405 and front exterior guide track 442 may be provided with similarly configured guide rails 480481, 482-483, in that the distance between linear guide rails 480 and 481 is substantially the same as the distance between linear guide rails 482 and 483. Also, rails 480-483 may be of substantially similar length, cross-section, and physical characteristics. Similarly-configured guide rails 480-483 may be advantageous where it is desirable to use tooling positioning and support fixtures and hardware, for example, to permit selected types of tooling or supports to be mounted on the lateral interior, lateral exterior, or top support surface of bridge module 400.

FIG. 5 generally depicts embodiments of the present invention, which may be configured as modular universal holding fixture 500, which includes fixed base 505, registration frame 510, moveable bridge modules 520-522, and fixed bridge modules 523, 524. In general, bridge modules 520-524 may be configured similar to bridge module 200, and may be moved into a respective selectable registration position. In addition, bridge modules 520-524 may be disposed similar to bridge module 400, that is, configured to receive tooling 550-554 such that workpiece 590 may be supported during manufacturing operations associated with aircraft part production. Tooling 550-552 on moveable bridge modules 520-522 may be linear actuators such as linear actuator 430 which includes suction cup assembly 432; indexable head 434 positioned proximate to suction cup assembly 432; and support tooling 436 coupled to indexable head 434 and adapted to provide support to edges of a workpiece panel, here workpiece 590. Tooling 553, 554 received in fixed bridge modules 523, 524 may not be provided with fitting and supports such as suction cup assembly 432, indexable head 434, and support tooling 436. In general, bridge modules 520-524 may be configured to repositionably constrain respective tooling 550-554 in respective selectable indexed positions, as described, for example, with respect to bridge modules 120, 122, 124, 200, and 400. Also, registration frame 510 may be a modular registration frame formed from releasably interlocking registration frame modules 511-513.

FIG. 6 generally illustrates yet another embodiment of the present invention, in which bridge module 600, similar to bridge modules 120, 122, 124, 200, and 400, may be configured to receive tooling 630 and tooling headers 670-671. Bridge module 600 may be disposed in a selectable registration position along a support frame (fixed base or registration frame—neither shown). Tooling 630 may be supported within central cavity 680, and transversely moveable on top support surface 605 to be repositionably constrained along top support track 640. Top support track 640 may be a pair of linear guide rails 641-642. Tooling 630 may be similar to linear actuator 430, and include suction cup assembly 632; indexable head 634 positioned proximate to suction cup assembly 632. Part 675, for example, a spar, may be held by tooling headers 670-671 and bridge module 600 may be configured to engage and support tooling headers 670-671 for transverse movement on front exterior guide track 643 of front exterior support surface 610. Guide track 643 may be a pair of linear guide rails 644-645. Bridge module 600 also may be configured to repositionably constrain tooling headers 670-671 along front exterior guide track 643. Tooling headers 670-671 may be fitted with side actuators 676-677 configured to transversely cooperate to accommodate different sides of part 675, as may be encountered during part production. Generally, bridge module 600 may be configured to repositionably constrain respective tooling 630 and tooling headers 670-671 in respective selectable indexed positions, Thus, modular universal holding fixture 100 according to present embodiments may be adapted to suit the extant or developing production demands presented by a variety of workpieces in a modern manufacturing operation. A certain exemplary embodiment of modular universal holding fixture 100 beneficially includes fiducial base 110 having affixed thereto five stationary bridge modules, such as bridge module 124, and having a registration frame 115 attached in alignment with fiducial base 110. In this exemplary embodiment, frame 115 includes plural constituent, releasably interlocked, registration frame modules such as modules 310-313. Frame 115 is engaged by twenty moveable bridge modules, such as bridge modules 120, 122, to which plural tooling are repositionably constrained in respective indexed positions.

FIG. 7A illustrates an embodiment of bridge module 700, similar to bridge modules 120, 122, 124, 200, and 600, supporting part 675 as depicted in FIG. 6. For the purposes of illustration, bridge module 700 is shown oriented to transverse-vertical (YZ) plane 163. Tooling 130 may be a passive linear actuator. Gantry 144 may bring N/C machine head 142 proximate to, and in contact with, tooling 130 for alignment. N/C machine head 142 may move tooling 130 transversely along axis 164, vertically along axis 166, or both, until tooling 130 is aligned in a preselected indexed position. Next, N/C machine head 142 may engage a locking mechanism (not shown), and repositionably constrain tooling 130 in the preselected indexed position. Also, N/C machine head 142 may similarly contact, move, align, engage a locking mechanism, and repositionably constrain one or more of tooling 731-733. Side actuators 676-677 also may be actuated to position support tooling 670-671, such that part 675 may be securely held during a manufacturing operation.

Similarly, FIG. 7B illustrates bridge module 700, also oriented to transverse-vertical (YZ) plane 163, supporting workpiece 590, similar to the depiction of FIG. 5. As in FIG. 7A, tooling 130 may be a passive linear actuator. Side actuators 676-677 of spar support tooling 670-671, as illustrated in FIG. 7A, may be retracted to accommodate workpiece 590. Gantry 144 may bring N/C machine head 142 proximate to, and in contact with, tooling 130, 731-733 for alignment. N/C machine head 142 may contact, move, align, engage a locking mechanism, and repositionably constrain one or more of tooling 130, 731-733 in a respective preselected indexed position. Workpiece 590 is illustrated to be securely held for N/C machine head 142 to perform a manufacturing operation.

In general, embodiments of the present invention may include a fixed bridge module and multiple moveable bridge modules. The fixed bridge module may be used to establish a solid "home" position for all production parts. The moveable modules may be moved to substantially any position along the module length to accommodate substantially any production part changes. Linear actuators within one or both of the fixed or moveable bridge modules may be moved to substantially any position along the width of the bridge module to accommodate substantially any production part width change. The bridge modules may be configured to provide additional supports for panel edges and, thus, linear actuators used herewith may be provided with the ability to mount additional support for substantially any panel edge. Moveable modules may be configured to mount thereon additional tooling headers and side actuators to support unique production parts during manufacturing operations, such as a drilling operation. These tooling headers also may be configured to move along the bridge module width to accommodate additional part configurations.

Embodiments of the present invention typically define a work envelope such that selected combinations of bridge module, which may include one or more of a fixed bridge module, a moveable bridge module, or both, can be arranged to accommodate workpieces related to current production parts, while remaining sufficiently flexible to accommodate future production parts which may not be presently defined. Using moveable modules, for example, may allow linear actuators to be positioned and employed throughout the work envelope, such that the linear actuators may not be confined to a traditional universal holding fixture using a fixed machine bed.

Thus, as described herein, embodiments of the present invention may provide an apparatus for holding a workpiece in a preselected position during a manufacturing operation, such as drilling or machining. The holding apparatus may include a foundation, longer in length (longitudinal direction) than in width (transverse direction) and having rails mounted lengthwise thereon, with a fixed mounting base at one end of the foundation length. An array of vertically adjustable linear actuators may be contained within the fixed mounting base and may be adjustably positioned across the foundation width. The actuators may include support and clamping apparatus configured to accommodate multiple workpiece shapes and sizes. Moveable carriages, respectively configured as moveable bridge modules, may be mounted on the rails and moved along the foundation length. A series of vertically adjustable linear actuators may be mounted on the moveable carriages, with the actuators being mounted on the moveable carriages, and with the actuators being moveable along the foundation length and the foundation width. A gantry may be mounted on the rails above the foundation and moveable along the foundation length. The gantry may include a multi-axis head capable of a manufacturing operation, and operable by a numerically-controlled machine. The gantry also may be configured to position the vertical actuators in one or more of the x, y, or z directions. Accordingly, a person having ordinary skill in the art would recognize that present disclosure teaches numerous possible arrangements for a modular universal holding fixture, in accordance with the embodiments herein.

In light of the above, the scope of the present invention should not be limited to that of the particular embodiments illustrated and described herein, as they are only exemplary in nature, but instead, should be fully commensurate with that of the claims appended hereafter and their functional equivalents.

The invention claimed is:

1. An apparatus for holding a workpiece in a preselected position during a manufacturing operation, comprising:
   a foundation being longer in length than in width;
   rails mounted lengthwise on the foundation;
   a fixed mounting base attached at one end of the foundation length wherein said fixed mounting base is fixedly attached to said foundation;
   an array of vertically adjustable linear actuators supported within the fixed mounting base, and adjustably positioned across the foundation width;
   moveable carriages mounted on the rails and moveable along the foundation length; and
   a series of vertically adjustable linear actuators being mounted on respective moveable carriages and adjustably positioned across the foundation width; wherein the apparatus further comprises tooling disposed through a central cavity of and releasably coupled to the respective moveable carriages, wherein the tooling is configured to support the corresponding vertically adjustable linear actuators.

2. The apparatus of claim 1, further comprising:
   a gantry mounted above the foundation on the rails and moveable along the foundation length, wherein the gantry is configured to position at least one of the series of vertically adjustable linear actuators in one or more of the x, y, or z directions.

3. The apparatus of claim 2, wherein the gantry includes a multi-axis head capable of performing a manufacturing operation, and wherein the gantry is operable by a numerically-controlled machine.

4. The apparatus of claim 1, wherein at least one of the series of vertically adjustable linear actuators are moveable along the foundation length via the respective moveable carriage and along the foundation width along the respective moveable carriage.

5. A universal holding fixture, comprising:
   a bridge module positionable at a selectable registration position corresponding to a predefined fiducial location, wherein the bridge module is configured to support for transverse movement and to repositionably constrain at least one tooling, and wherein the bridge module comprises:
- a top bridge support surface having a top guide track disposed thereon,
- a front exterior lateral bridge support surface having a front exterior guide track disposed thereon,
- a rear exterior lateral bridge support surface having a rear exterior guide track disposed thereon,
- a front interior lateral bridge support surface having a front interior guide track disposed within a cavity of the bridge module thereon, and
- a rear interior lateral bridge support surface having a rear interior guide track disposed within a cavity of the bridge module thereon.

6. The universal holding fixture of claim 5, further comprising:
- a fiducial base fixable to the predefined fiducial location; and
- a registration frame attached in alignment with the fiducial base and extending along a longitudinal axis, wherein the bridge module is configured to moveably engage with the registration frame at the selectable registration position.

7. The universal holding fixture of claim 6, wherein the bridge module is configured to repositionably constrain the at least one tooling at a selectable indexed position corresponding to the predefined fiducial location.

8. The universal holding fixture of claim 6, wherein the registration frame further comprises:
- a plurality of registration frame modules, each registration frame module including a registration frame support and a registration frame run, wherein a selected one of the plurality of registration frame modules releasably interlocks with a selected other of the plurality of registration frame modules.

9. The universal holding fixture of claim 6, further comprising a plurality of bridge modules, wherein each of the plurality of bridge modules is configured to engage with the registration frame at a respective selectable registration position corresponding to the predefined fiducial location, wherein each of the plurality of bridge modules is configured to support for transverse movement and to repositionably constrain a respective tooling at a respective selectable indexed position corresponding to the predefined fiducial location.

10. The universal holding fixture of claim 5, wherein the bridge module is configured to support for transverse movement and to repositionably constrain the at least one tooling at a selectable indexed position corresponding to the predefined fiducial location.

11. The universal holding fixture of claim 10, further comprising:
- a fiducial base fixable to the predefined fiducial location; and
- a stationary bridge module affixed to the fiducial base at a selectable stationary registration position, wherein the stationary bridge module is configured to repositionably constrain at least one tooling at a selectable indexed position corresponding to the predefined fiducial location.

12. The universal holding fixture of claim 10, further comprising:
- a registration frame attached in alignment with the fiducial base and extending along a longitudinal axis; and
- moveable bridge modules, wherein each of the moveable bridge modules is configured to engage with the registration frame at a respective selectable registration position corresponding to a predefined fiducial location, and wherein each of the moveable bridge modules is configured to support for transverse movement and to repositionably constrain a tooling at a respective selectable indexed position corresponding to the predefined fiducial location.

13. A universal holding fixture, comprising:
- a fiducial base fixable to a predefined fiducial location;
- a registration frame attached in alignment with the fiducial base and extending along a longitudinal axis corresponding to the predefined fiducial location, wherein the registration frame includes registration frame modules, and wherein at least one of the registration frame modules releasably interlocks with at least one other of the registration frame modules to form the registration frame;
- a stationary bridge module affixed to the fiducial base at a selectable stationary registration position, wherein the stationary bridge module is configured to support for transverse movement and to repositionably constrain a tooling at a selectable indexed position corresponding to the predefined fiducial location wherein said stationary brige module is fixedly attached to said fiducial base; and
- a moveable bridge module configured to engage with the registration frame at a selectable registration position corresponding to the predefined fiducial location,
wherein the moveable bridge module is configured to support for transverse movement and to repositionably constrain another tooling at another selectable indexed position corresponding to the predefined fiducial location,
wherein the universal holding fixture is a modular universal holding fixture.

14. The universal holding fixture of claim 13, wherein the moveable bridge module further comprises:
- a bridge support surface having a guide track disposed thereon, wherein the guide track includes linear guide rails, comprising:
  - a top bridge support surface having a top guide track disposed thereon,
  - a front exterior lateral bridge support surface having a front exterior guide track disposed thereon,
  - a rear exterior lateral bridge support surface having a rear exterior guide track disposed thereon,
  - a front interior lateral bridge support surface having a front interior guide track disposed thereon, and
  - a rear interior lateral bridge support surface having a rear interior guide track disposed thereon;
- wherein the guide track includes indexing points set apart by a predefined interval to facilitate repositionably constraining a tooling at a respective selectable indexed position represented by a respective one of the indexing points.

15. The universal holding fixture of claim 13, wherein the stationary bridge module further comprises:
- a bridge support surface having a guide track disposed thereon, wherein the guide track includes linear guide rails, comprising:
  - a top bridge support surface having a top guide track disposed thereon,
  - a front exterior lateral bridge support surface having a front exterior guide track disposed thereon,
  - a rear exterior lateral bridge support surface having a rear exterior guide track disposed thereon, a front interior lateral bridge support surface having a front interior guide track disposed thereon, and a rear interior lateral bridge support surface having a rear interior guide track disposed thereon;

wherein the guide track includes indexing points set apart by a predefined interval to facilitate transversely moving and repositionably constraining a tooling at a respective selectable indexed position represented by a respective one of the indexing points.

16. The universal holding fixture of claim 13, further comprising tooling disposed through a central cavity of and coupled to the stationary bridge module and the moveable bridge module.

17. A method of holding a workpiece in a preselected position during a manufacturing operation, comprising:

adjustably positioning moveable carriages along rails mounted lengthwise on a foundation having a foundation length longer than a foundation width, wherein each moveable carriage includes a respective series of vertically adjustable linear actuators mounted thereon, and adjustably positioning ones of the respective series of vertically adjustable linear actuators across a width of a respective moveable carriage, wherein the vertical adjustable linear actuators are supported by tooling disposed through a central cavity of the respective moveable carriage with said tooling extending below sides of said moveable carriage.

18. The method of claim 17, further comprising: adjustably positioning the ones of the respective series of vertically adjustable linear actuators along the foundation length and the foundation width.

19. The method of claim 18, further comprising adjustably positioning ones of an array of vertically adjustable linear actuators across a width of a fixed mounting base attached to the foundation.

20. The method of claim 18, further comprising adjustably positioning with a gantry mounted along the rails ones of the respective series of vertically adjustable linear actuators in one or more of the x, y, or z directions with respect to a corresponding respective moveable carriage.

21. The method of claim 20, wherein the gantry includes a multi-axis head, and wherein the method further comprises performing a manufacturing operation on the workpiece using the multi-axis head.

* * * * *